(12) United States Patent
Zaib et al.

(10) Patent No.: US 9,587,625 B2
(45) Date of Patent: Mar. 7, 2017

(54) REMOTE SENSING SYSTEM FOR WIND TURBINES

(75) Inventors: Ali Zaib, Aalborg (DK); Robert Bowyer, London (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 472 days.

(21) Appl. No.: 14/129,592

(22) PCT Filed: Jun. 29, 2012

(86) PCT No.: PCT/DK2012/050222
§ 371 (c)(1),
(2), (4) Date: Mar. 21, 2014

(87) PCT Pub. No.: WO2013/000475
PCT Pub. Date: Jan. 3, 2013

(65) Prior Publication Data
US 2014/0217729 A1 Aug. 7, 2014

Related U.S. Application Data

(60) Provisional application No. 61/503,644, filed on Jul. 1, 2011.

(30) Foreign Application Priority Data

Jun. 30, 2011 (DK) .................. 2011 70351

(51) Int. Cl.
*F03D 11/00* (2006.01)
*F03D 7/00* (2006.01)
(Continued)

(52) U.S. Cl.
CPC .............. *F03D 7/00* (2013.01); *F03D 7/048* (2013.01); *F03D 17/00* (2016.05); *G01W 1/00* (2013.01);
(Continued)

(58) Field of Classification Search
None
See application file for complete search history.

(56) References Cited

U.S. PATENT DOCUMENTS

2010/0133848 A1  6/2010  Piasecki et al.
2011/0295438 A1*  12/2011  Rogers .................. F03D 7/0204
                                                                  700/287

FOREIGN PATENT DOCUMENTS

DE  102009030886 A1  12/2010
EP    1460266 A2    9/2004
(Continued)

OTHER PUBLICATIONS

International Search Report; PCT/DK2012/050222; Sep. 14, 2012.
DK Search Report; PA201170351; Feb. 13, 2012.

*Primary Examiner* — Ryan Jarrett
(74) *Attorney, Agent, or Firm* — Patterson + Sheridan, LLP (57) ABSTRACT

Embodiments of the invention generally relate to using remote sensing equipment such as a Light Detection and Ranging (LIDAR) device to detect wind characteristics for use by wind turbines of a wind park. A wind park controller may received raw wind data from the remote sensing device and determine one or more turbines that can use the raw wind data. The raw wind data may be converted to customized data for each of the one or more wind turbines. Upon being provided the customized wind data, the one or more wind turbines may adjust one or more operational characteristics to improve power production or avoid damage to turbine components.

18 Claims, 5 Drawing Sheets

(51) Int. Cl.
 *F03D 7/04* (2006.01)
 *G01W 1/00* (2006.01)
(52) U.S. Cl.
 CPC ... *F05B 2260/8211* (2013.01); *F05B 2270/32* (2013.01); *F05B 2270/321* (2013.01); *F05B 2270/8042* (2013.01); *Y02E 10/722* (2013.01); *Y02E 10/723* (2013.01)

(56) References Cited

FOREIGN PATENT DOCUMENTS

| | | |
|---|---|---|
| WO | 03012293 A2 | 2/2003 |
| WO | 2011022024 A1 | 2/2011 |
| WO | 2011036553 A1 | 3/2011 |

* cited by examiner

FIG. 7

# REMOTE SENSING SYSTEM FOR WIND TURBINES

FIELD OF THE INVENTION

Embodiments of the invention generally relate to detecting one or more environmental conditions around wind turbines of a wind park, and more specifically to using remote sensing equipment to detect wind characteristics.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbines generators may be arranged together in a wind park or wind power plant to generate sufficient energy to support a grid.

In modern high performance wind turbines, it is becoming increasingly important to control the aerodynamic forces in conjunction with the aero-elastic response through active manipulation. Such control may be accomplished not only by aerodynamic means, but also by, for example, controlling the pitch of the blade or the rotational speed of the wind turbine rotor.

Most modern wind turbines are equipped with a wind sensor on the nacelle that is capable of detecting the wind speed and direction. Based on the detected wind speed and direction one or more control decisions such as pitching blades, yawing the turbine upwind, etc., may be taken to ensure generation of a desired amount of power, reduction of loads and stresses on wind turbine components, and the like.

SUMMARY OF THE INVENTION

Embodiments of the invention generally relate to detecting one or more environmental conditions around wind turbines of a wind park, and more specifically to using remote sensing equipment to detect wind characteristics.

One embodiment of the invention provides a computer implemented method for determining wind data for a wind farm. The method generally comprises receiving raw wind data from a remote sensing device, determining one or more wind turbines to which the raw wind data is relevant, determining customized wind data for each of the one or more wind turbines, and transferring the customized wind data respectively to each of the one or more wind turbines.

Another embodiment of the invention provides a wind park controller, generally comprising a memory device comprising a control algorithm and a processor. The processor, when executing the control algorithm, is generally configured to receive raw wind data from a remote sensing device, determine one or more wind turbines to which the raw wind data is relevant, determine customized wind data for each of the one or more wind turbines, and transfer the customized wind data respectively to each of the one or more wind turbines.

Yet another embodiment of the invention provides a wind power plant, generally comprising a plurality of wind turbines, a wind park controller, and at least one remote sensing device. The wind park controller is generally configured to receive raw wind data from the remote sensing device, determine one or more wind turbines of the plurality of wind turbines to which the raw wind data is relevant, determine customized wind data for each of the one or more wind turbines, and transfer the customized wind data respectively to each of the one or more wind turbines.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

In general, it is desirable for a wind turbine to have advance knowledge about the properties of the wind which will shortly arrive at the turbine. Such knowledge gives the turbine controller sufficient time to adjust operating parameters, such as blade pitch angle or rotor speed, to match the oncoming conditions. This may be done for a variety of reasons. At lower wind speeds it may be important to maximize the energy that can be extracted by the wind by setting parameters such as blade pitch angle to an optimum position. On the other hand, at higher wind speeds it is important to adjust turbine parameters to avoid operation under conditions which might lead to damage. For example, wind turbines typically have a predefined rated power. When this power output is exceeded, the blade pitch angle and other operating parameters may be adjusted to reduce the amount of energy that is extracted from the wind. Wind turbines also need to be designed to withstand extreme operating conditions. Typically, these extreme conditions are rare single events or a small number of cumulative events which cause large, often unbalanced, loads on the wind turbine and will damage the turbine or reduce the overall lifetime of the turbine components, such as the blades or the gearbox by a significant amount.

Figure 1:
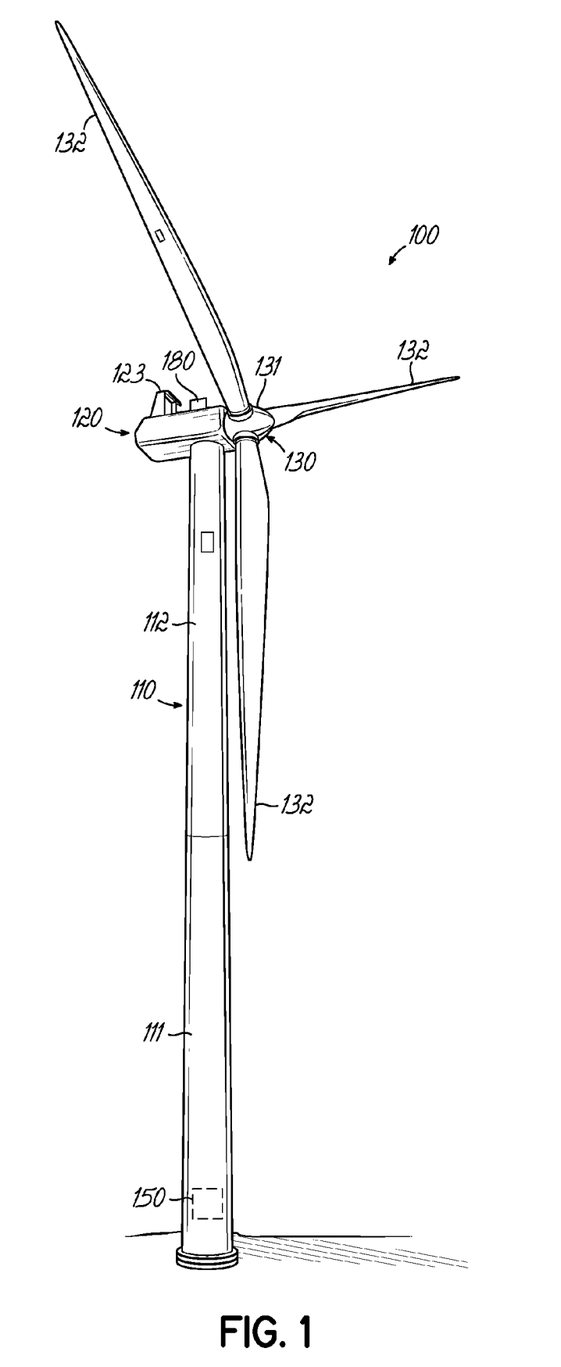
FIG. 1 illustrates an exemplary wind turbine according to an embodiment of the invention.

FIG. 1 illustrates an exemplary wind turbine 100 according to an embodiment of the invention. As illustrated in FIG. 1, the wind turbine 100 includes a tower 110, a nacelle 120, and a rotor 130. In one embodiment of the invention, the wind turbine 100 may be an onshore wind turbine. However, embodiments of the invention are not limited only to onshore wind turbines. In alternative embodiments, the wind turbine 100 may be an off shore wind turbine located over a water body such as, for example, a lake, an ocean, or the like.

The tower 110 of wind turbine 100 may be configured to raise the nacelle 120 and the rotor 130 to a height where strong, less turbulent, and generally unobstructed flow of air may be received by the rotor 130. The height of the tower 110 may be any reasonable height. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 131 and at least one blade 132 (three such blades 132 are shown in FIG. 1). The rotor hub 131 may be configured to couple the at least one blade 132 to a shaft (not shown). In one embodiment, the blades 132 may have an aerodynamic profile such that, at predefined wind speeds, the blades 132 experience lift, thereby causing the blades to radially rotate around the hub. The nacelle 120 may include one or more components configured to convert aero-mechanical energy of the blades to rotational energy of the shaft, and the rotational energy of the shaft into electrical energy.

FIG. 1 also depicts a wind sensor 123. Wind sensor 123 may be configured to detect a direction of the wind at or near the wind turbine 100. By detecting the direction of the wind, the wind sensor 123 may provide useful data that may determine operations to yaw the wind turbine 100 into the wind. The wind sensor 123 may use the speed and/or direction of the wind to control the blade pitch angle. Wind speed data may be used to determine an appropriate pitch angle that allows the blades 132 to capture a desired amount of energy from the wind or to avoid excessive loads on turbine components. In some embodiments, the wind sensor 123 may be integrated with a temperature sensor, pressure sensor, and the like, which may provide additional data regarding the environment surrounding the wind turbine. Such data may be used to determine one or more operational parameters of the wind turbine to facilitate capturing of a desired amount of energy by the wind turbine 100 or to avoid damage to components of the wind turbine.

Figure 2:
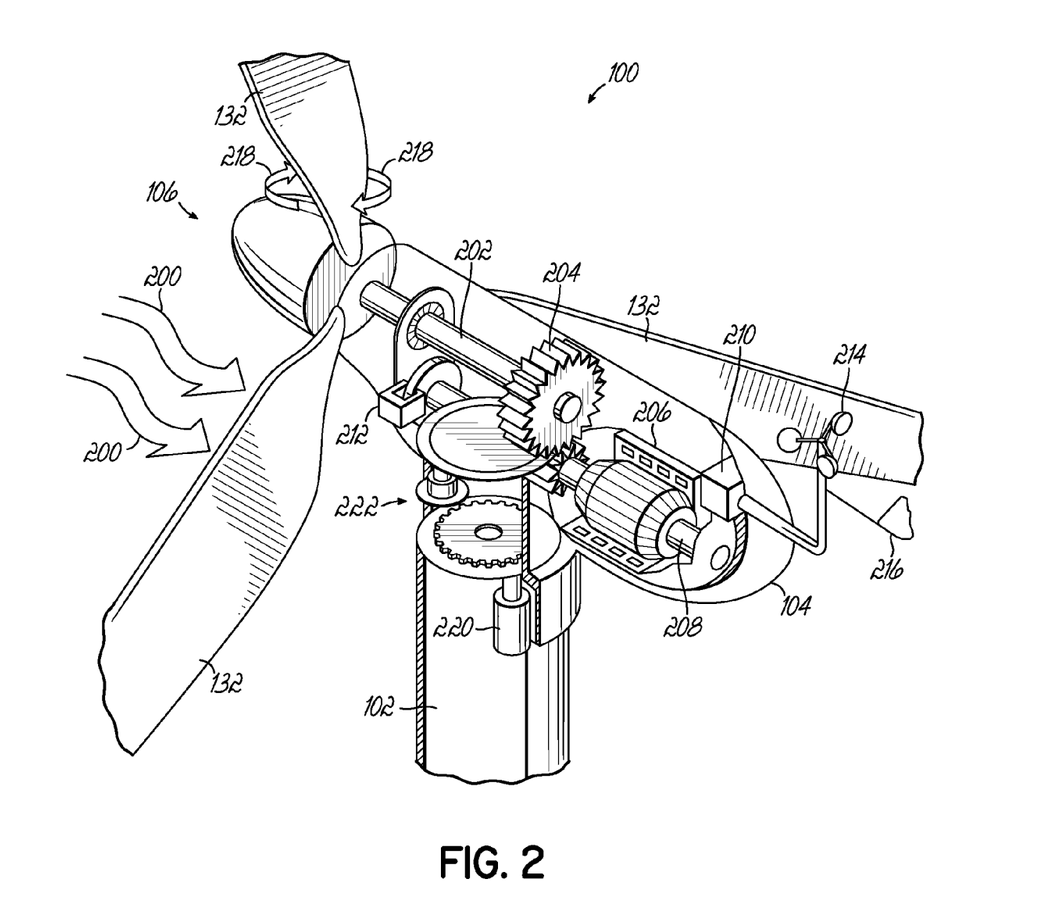
FIG. 2 illustrates an exemplary wind turbine nacelle according to an embodiment of the invention.

FIG. 2 illustrates a diagrammatic view of typical components internal to the nacelle 120 and tower 110 of a wind turbine generator 100. When the wind 200 pushes on the blades 132, the rotor 130 spins, thereby rotating a low-speed shaft 202. Gears in a gearbox 204 mechanically convert the low rotational speed of the low-speed shaft 202 into a relatively high rotational speed of a high-speed shaft 208 suitable for generating electricity using a generator 206. In an alternative embodiment, the gear box may be omitted, and a single shaft, e.g., the shaft 202 may be directly coupled with the generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106, in turn. The braking system 212 may prevent damage to the components of the wind turbine generator 100. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

The generator 206 may be configured to generate a three phase alternating current based on one or more grid requirements. In one embodiment, the generator 206 may be a synchronous generator. Synchronous generators may be configured to operate at a constant speed, and may be directly connected to the grid. In some embodiments, the generator 206 may be a permanent magnet generator. In alternative embodiments, the generator 206 may be an asynchronous generator, also sometimes known as an induction generator. Induction generators may or may not be directly connected to the grid. For example, in some embodiments, the generator 206 may be coupled to the grid via one or more electrical devices configured to, for example, adjust current, voltage, and other electrical parameters to conform with one or more grid requirements. Exemplary electrical devices include, for example, inverters, converters, resistors, switches, transformers, and the like.

Embodiments of the invention are not limited to any particular type of generator or arrangement of the generator and one or more electrical devices associated with the generator in relation to the electrical grid. Any suitable type of generator including (but not limited to) induction generators, permanent magnet generators, synchronous generators, or the like, configured to generate electricity according to grid requirements falls within the purview of the invention.

Figure 3:
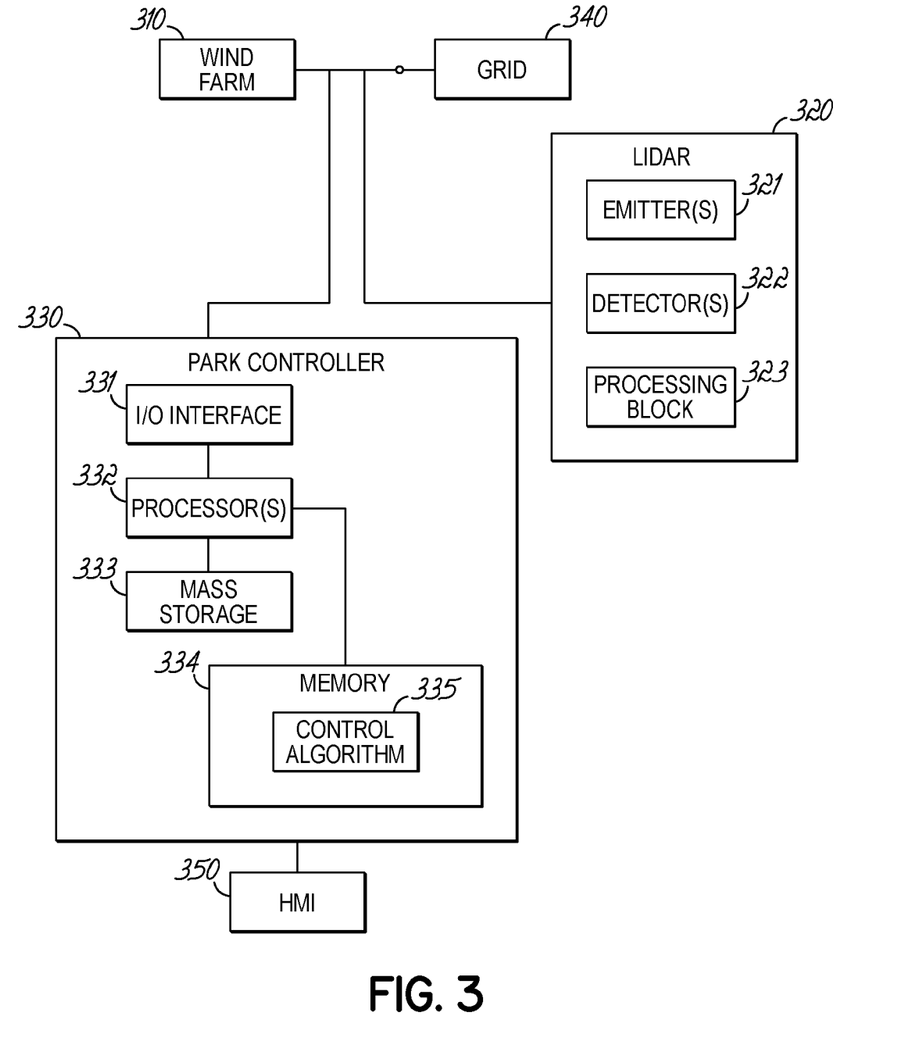
FIG. 3 illustrates a wind power plant according to an embodiment of the invention.

FIG. 3 illustrates an exemplary wind power plant 300 according to an embodiment of the invention. As illustrated, the wind power plant 300 may include a wind farm 310 coupled with a grid 340, a park controller 330, and at least one remote sensing device such as a Light Detection and Ranging (LIDAR) device 320. In alternative embodiments, the device 320 may be a Sonic Detection and Randing (SODAR) device, a Laser Doppler Vibrometer (LDV), or the like. The wind farm 310 may include one or more wind turbines, such as the representative wind turbine 100. The wind turbines collectively act as a generating plant ultimately interconnected by transmission lines with a power grid 340, which may be a three-phase power grid. The plurality of turbines of wind farm 310 may be gathered together at a common location in order to take advantage of the economies of scale that decrease per unit cost with increasing output. It is understood by a person having ordinary skill in the art that the wind farm 310 may include an arbitrary number of wind turbines of given capacity in accordance with a targeted power output.

The power grid 340 generally consists of a network of power stations, transmission circuits, and substations coupled by a network of transmission lines. The power stations generate electrical power by nuclear, hydroelectric, natural gas, or coal fired means, or with another type of renewable energy like solar and geothermal. Additional wind farms analogous to the wind farm 310 depicted may also be coupled with the power grid 340. Power grids and wind farms typically generate and transmit power using Alternating Current (AC).

The controller 330 can be implemented using one or more processors 331 selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in a memory 334.

Memory 334 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing digital information.

Mass storage device 333 may be a single mass storage device or a plurality of mass storage devices including but not limited to hard drives, optical drives, tape drives, non-volatile solid state devices and/or any other device capable of storing digital information. An Input/Output (I/O) interface 331 may employ a suitable communication protocol for communicating with the wind turbines of wind farm 310.

Processor 332 operates under the control of an operating system, and executes or otherwise relies upon computer program code embodied in various computer software applications, components, programs, objects, modules, data structures, etc. to read data from and write instructions to one or more wind turbines of wind farm 310 through I/O interface 331, whether implemented as part of the operating system or as a specific application.

A human machine interface (HMI) 350 is operatively coupled to the processor 332 of the controller 330 in a known manner. The HMI 350 may include output devices, such as alphanumeric displays, a touch screen, and other visual indicators, and input devices and controls, such as an alphanumeric keyboard, a pointing device, keypads, push-buttons, control knobs, etc., capable of accepting commands or input from the operator and transmitting the entered input to the processor 332.

In one embodiment of the invention, the controller 330 may be configured to generate wind parameter signals 311 to the wind turbines in the wind farm 310. The wind parameter signals may include, for example, wind speed, wind direction, and the like. In one embodiment, the wind parameter signals may describe characteristics of wind approaching the one or more turbines of the wind park based on measurements made by the LIDAR device 320, as will be described in greater detail below. Based on the wind parameter signals 311 the wind turbines in the wind farm 310 may adjust one or more operational parameters, e.g., blade pitch angles, to achieve desirable levels of power production, avoid damage to wind turbine components, and the like. Values of the wind parameter signals may be determined by the control algorithm 335, as is discussed below.

The LIDAR device 320 may be used to measure wind speed and/or direction at a remote location. Knowledge about the wind speed and direction at a remote location, e.g., in front of a rotor of a wind turbine, may allow the wind turbine to optimize one or more operational parameters such as blade pitch angle to reduce loads on wind turbine components and/or increase energy capture. To measure the wind speed remotely, a light beam (e.g., a Laser beam) may be emitted into oncoming wind by, for example, an emitter of the LIDAR 320. The emitted light may reflect off of aerosols (e.g., pollen, dust) in the wind and may be scattered in multiple directions.

A portion of the scattered light may travel back to the LIDAR device 320, and may be detected by, e.g., a detector of LIDAR device 320. Based on the backscattered light, one or more properties of the aerosols may be determined by a processor (e.g., a processor included in the LIDAR device, or the processor 332. For example, the processor may use the Doppler Effect to determine properties of the aerosols, such as speed and direction of movement. Because the properties of the aerosols strongly correlate with the property of the wind carrying the aerosols, properties of the wind, e.g. wind speed and direction, may be determined based on the properties of the aerosols.

As illustrated in FIG. 3 the LIDAR device 320 may include an emitter 321, a detector 322, and a processing block 323. While a single emitter detector pair 310-320 are shown in FIG. 3, in alternative embodiments, the LIDAR 180 may include any number of emitters and detectors. The emitter 311 may be configured to generate a light beam. For example, in one embodiment, LIDAR 320 may be configured to emit an ultra violet, visible, near infra-red and/or infra-red light beam. The detector 322 may be configured to detect backscattering of the light beam emitted by the emitter from one or more objects. The processing block 323 may be configured to determine one or more properties of the backscattered light detected by detector 320 and determine one or more properties of the one or more objects from which the light beam is reflected.

Figure 4:
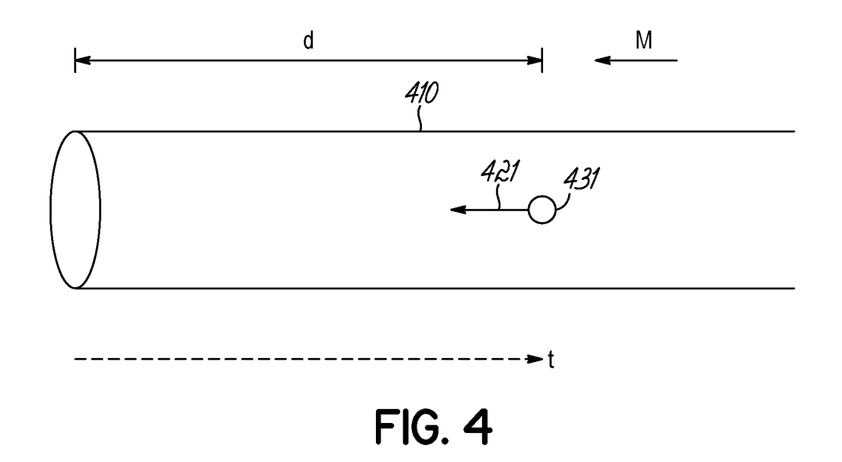
FIG. 4 illustrates operation of a light detection and ranging device (LIDAR) according to an embodiment of the invention.

FIG. 4 diagrammatically illustrates operation of a pulsed LIDAR system according to an embodiment of the invention. As shown, radiation 410 may be emitted by the LIDAR 320 into oncoming wind. In one embodiment, the radiation 410 may be pulsed radiation. The radiation 410 may be used to measure properties of the wind at a predefined distance d, e.g., at 25 m, 50 m, 75 m, and/or 100 m from the LIDAR device 320. FIG. 4 assumes that it takes time t for the radiation to travel the distance d. As further illustrated in FIG. 4, at least a portion of the pulsed radiation may be reflected back towards the LIDAR 320 by aerosols in the wind. For example, an aerosol particle 431 at the distance d from the LIDAR 320 may reflect a portion 421 of the pulsed radiation back to the LIDAR 320. In one embodiment of the invention, the backscattered portions of the radiation 421 may be received by the detector 322 at a time 2t. The processing block 323 (See FIG. 3) may analyze the detected backscattered radiation to determine one or more properties of the aerosol particle 431. For example, the processing block 330 may utilize the Doppler Effect to determine the speed and direction of the aerosol particle 431.

In one embodiment, the processing block 323 may be configured to determine a line of sight velocity of the aerosol particles. For example, referring to FIG. 4, the processing block 323 may be configured to determine the velocity of the aerosol particle 431 in the direction M. The measured line of sight velocity may be transferred from the LIDAR device 320 to the park controller 330, in one embodiment.

In one embodiment of the invention, the control algorithm 335 may receive the line of sight velocities measured by the LIDAR device 323 and convert the line of sight velocities to one or more parameters describing wind characteristics, e.g., axial wind speed, lateral wind speed, absolute wind speed, and/or the wind direction. The axial wind speed may refer to the wind speed in a direction that is perpendicular to the rotor plane, and the lateral wind speed may refer to the wind speed in a direction that is parallel to the rotor plane. In one embodiment, the control algorithm 335 may determine customized wind parameters for each of one or more wind turbines in the wind farm 310. For example, the control algorithm may first determine one or more wind turbines in the wind farm that may be affected by the measurements from the LIDAR device 320. Thereafter, based on the received line of sight velocities, the control algorithm 335 may determine (based on the position of each turbine), a wind speed and/or wind direction for each of the turbines.

Figure 5:
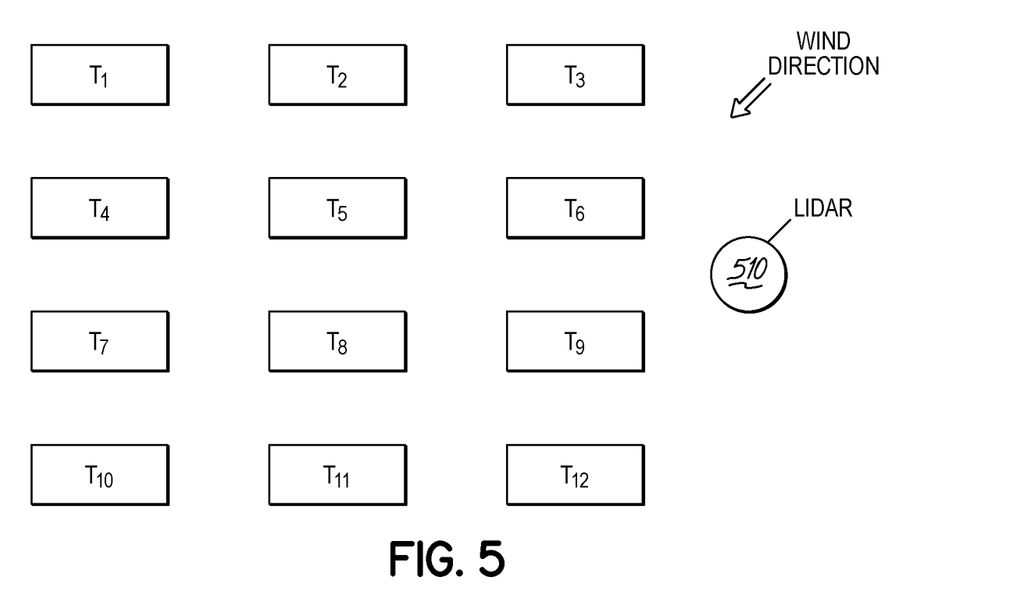
FIG. 5 illustrates an exemplary wind park according to an embodiment of the invention.

FIG. 5 illustrates an exemplary wind farm 500 according to an embodiment of the invention. As illustrated, wind farm 500 includes a plurality of turbines T1-T12 and a LIDAR device 510. In one embodiment of the invention, the LIDAR device may measure the wind speed and/or wind direction (see FIG. 5), e.g., a line of sight wind speed and/or wind direction. The wind speed and direction may be transferred to a park controller 330 (not shown in FIG. 5). The park controller 330 may determine (based upon knowledge about the location of turbines T1-T12) that wind turbines T1, T2, T3, T6, T9, and T12 may be affected by the measurement of wind speed and direction by the LIDAR device 510. Accordingly, the park controller 330 (specifically, the control algorithm 335 of park controller 330) may determine and transfer customized wind speed and direction to each of turbines T1, T2, T3, T6, T9, and T12. In response to receiving respective wind speed and direction data, each of the turbines T1, T2, T3, T6, T9, and T12 may adjust one or more operational parameters, e.g., pitch angle, to capture a desirable amount of energy from the wind, to avoid damage to one or more components of the wind turbine, and the like.

In one embodiment of the invention, the park controller 330 may be configured to retrieve one or more parameters from the wind turbines of the wind farm in order to determine which particular wind turbines can use the wind data from a LIDAR device. Exemplary parameters that may be retrieved from the wind turbines may include, for example, yaw position, position of the wind turbines in the wind park, activation/deactivation status of the turbine, and the like. In some embodiments, wind park data, e.g., wind turbine positions, may be stored in the memory 334, and may accordingly be derived therefrom.

Figure 6:
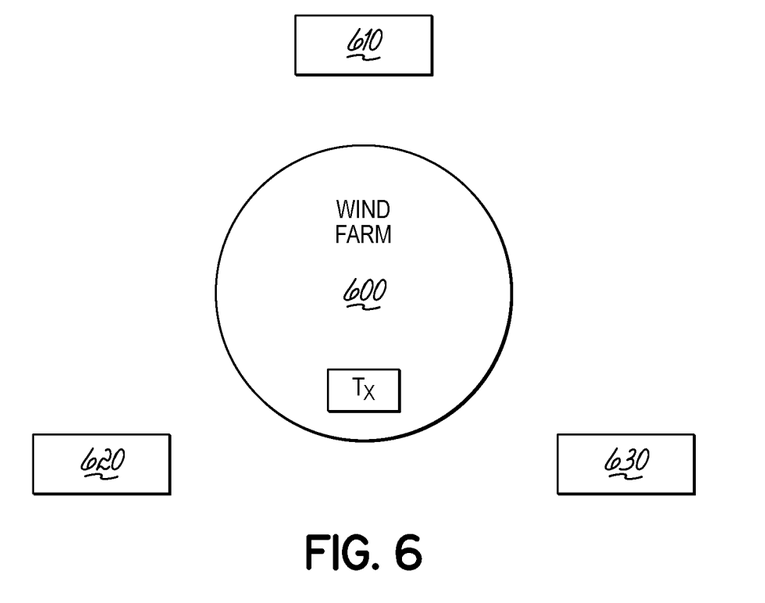
FIG. 6 illustrates another exemplary wind park according to an embodiment of the invention.

While a single LIDAR device 510 is shown in wind farm 500, in alternative embodiments, any number of LIDAR devices may be placed at strategic locations around the wind farm 500 to capture wind data from multiple directions. For example, FIG. 6 illustrates three LIDAR devices 610, 620, and 630 placed around a wind farm 600. When multiple LIDAR devices are placed around a wind park, it is possible that the data from multiple LIDAR devices may be relevant to the same wind turbine. For example, referring to FIG. 6, the data from both, LIDAR device 620 and LIDAR device 630, may be relevant to the wind turbine TX in certain circumstances. Accordingly the park controller 330 may be configured to combine the data received from the LIDAR devices 620 and 630, and provide the combined data to turbine TX. In one embodiment, the data from one LIDAR device may be weighted more heavily than another LIDAR device while combining respective data. For example, data from a LIDAR device that is closer to a turbine may be weighted more heavily that data from a LIDAR device that is further away.

Figure 7:
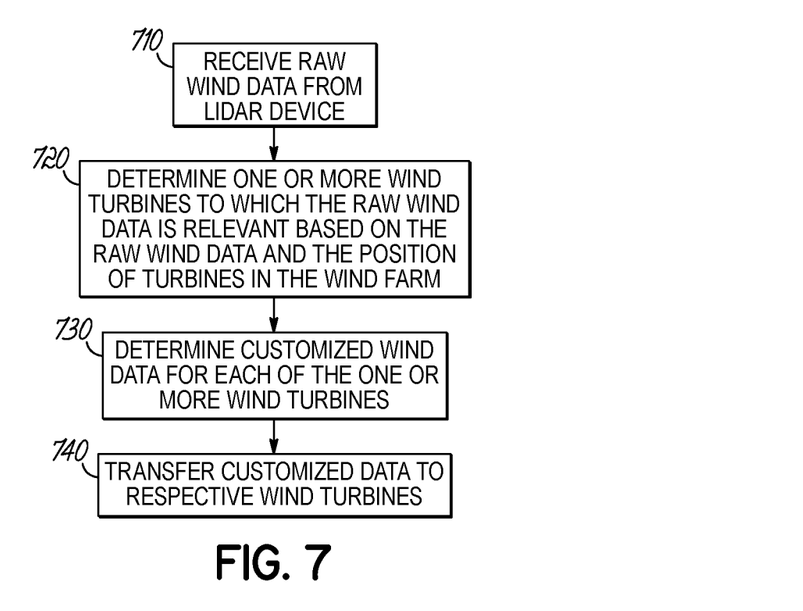
FIG. 7 is a flow diagram of exemplary operations performed by a wind park controller according to an embodiment of the invention.

FIG. 7 is a flow diagram of exemplary operations performed by a park controller 330, according to an embodiment of the invention. The operations may begin in step 710 by receiving raw wind data from a LIDAR device. The raw wind data may be, for example, line of sight wind speed and wind direction that may be measured by the LIDAR device. In step 720, the park controller may determine one or more turbines to which the raw wind data is relevant based on the raw wind data and the position of turbines in the wind farm. In step 730, the park controller may determine customized wind data for each of the one or more wind turbines to which the wind data is relevant. The customized wind data may include, for example, absolute wind velocity, axial wind velocity, lateral wind velocity, wind direction, and the like for each turbine. In step 740, the customized wind data may be transferred to respective turbines.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A computer implemented method comprising:
   receiving raw wind data from a remote sensing device located remotely from a plurality of wind turbines in a wind farm;
   determining a subset of the plurality of wind turbines to which the raw wind data is relevant based on the raw wind data and positions of the plurality of wind turbines;
   determining customized wind data for each of the subset of the plurality of wind turbines; and
   transmitting the customized wind data respectively to each of the subset of the plurality of wind turbines, wherein each of the subset of the plurality of wind turbines adjusts one or more operational parameters based on the customized wind data.

2. The method of claim 1, wherein the raw wind data comprises at least one of:
   a line of sight wind velocity measured by a Light Detection and Ranging (LIDAR) device; and
   wind direction determined by the LIDAR device.

3. The method of claim 1, wherein determining customized wind data for each of the subset of the plurality of the wind turbines comprises determining one or more of absolute wind speed, lateral wind speed, axial wind speed, and wind direction for each of the subset of the plurality of the wind turbines.

4. The method of claim 1, wherein determining customized wind data for each of the subset of the plurality of the wind turbines comprises combining raw wind data from two or more LIDAR devices.

5. The method of claim 1, wherein determining the subset of the plurality of wind turbines in the wind farm to which the raw wind data is relevant comprises determining that each of the subset of the plurality of the wind turbines are affected by measurements from the remote sensing device.

6. The method of claim 5, wherein the determining customized wind data comprises determining wind speed or wind direction for each of the subset of the plurality of the wind turbines to which the raw wind data is relevant, based on a location of each of the subset of the plurality of the wind turbines.

7. The method of claim 1, further comprising receiving wind turbine characteristics from the plurality of the wind turbines, wherein the wind turbine characteristics comprise at least one of yaw position, location of each of the subset of the plurality of the wind turbines in the wind farm, activation data of each of the subset of the plurality of the wind turbines, and deactivation data of each of the subset of the plurality of the wind turbines.

8. A wind park controller, comprising:
   a memory device comprising a control algorithm; and
   a processor which, when executing the control algorithm, is configured to:
      receive raw wind data from a remote sensing device located remotely from a plurality of wind turbines;
      determine a subset of a plurality of wind turbines in a wind farm to which the raw wind data is relevant based on the raw wind data and positions of the plurality of wind turbines;
      determine customized wind data for each of the subset of plurality of the wind turbines; and
      transmit the customized wind data respectively to each of the subset of the plurality of the wind turbines, wherein each of the subset of the plurality of wind turbines adjusts one or more operational parameters based on the customized wind data.

9. The wind park controller of claim 8, wherein the raw wind data comprises at least one of:
   a line of sight wind velocity measured by a Light Detection and Ranging (LIDAR) device; and
   wind direction determined by the LIDAR device.

10. The wind park controller of claim 8, wherein the processor is configured to determine customized wind data for each of the subset of the plurality of the wind turbines by determining one or more of absolute wind speed, lateral wind speed, axial wind speed, and wind direction for each of the subset of the plurality of the wind turbines.

11. The wind park controller of claim 8, wherein the processor if configured to determine customized wind data for each of the subset of the plurality of the wind turbines by combining raw wind data from two or more LIDAR devices.

12. The wind park controller of claim 8, wherein the processor is configured to determine that each of the subset of the plurality of wind turbines are affected by measurements from the remote sensing device, and
   wherein the processor is configured to determine wind speed or wind direction for each of the subset of the plurality of the wind turbines to which the raw wind data is relevant, based on location of each of the subset of the plurality of the wind turbines.

13. The wind park controller of claim 8, wherein the processor is further configured to receive wind turbine characteristics from the plurality of the wind turbines, wherein the wind turbine characteristics comprise at least one of yaw position, location of each of the subset of the plurality of the wind turbines in the wind farm, activation data of each of the subset of the plurality of the wind turbines, and deactivation data of each of the subset of the plurality of the wind turbines.

14. A wind power plant, comprising:
   a plurality of wind turbines;
   a wind park controller; and
   at least one remote sensing device located remotely from the plurality of wind turbines, wherein the wind park controller is configured to:
      receive raw wind data from the remote sensing device;
      determine a subset of wind turbines of the plurality of wind turbines to which the raw wind data is relevant based on the raw wind data and positions of turbines in the plurality of turbines;
      determine customized wind data for each of the subset of wind turbines of the plurality of wind turbines; and
      transmit the customized wind data respectively to each of the subset of wind turbines of the plurality of wind turbines, wherein each of the subset of the plurality of wind turbines adjusts one or more operational parameters based on the customized wind data.

15. The wind power plant of claim 14, wherein the raw wind data comprises at least one of:
   a line of sight wind velocity measured by a Light Detection and Ranging (LIDAR) device; and
   wind direction determined by the LIDAR device.

16. The wind power plant of claim 14, wherein the wind park controller is configured to determine customized wind data for each of the subset of wind turbines of the plurality of wind turbines by determining one or more of absolute wind speed, lateral wind speed, axial wind speed, and wind direction for each of the subset of wind turbines of the plurality of wind turbines.

17. The wind power plant of claim 14, wherein the wind park controller is configured to determine customized wind data for each of the subset of wind turbines of the plurality of wind turbines by combining raw wind data from two or more LIDAR devices.

18. The wind power plant of claim 14, wherein the wind park controller is further configured to:
   determine that each of the subset of wind turbines of the plurality of wind turbines are affected by measurements from the remote sensing device; and
   determine wind speed or wind direction for each of the subset of wind turbines of the plurality of the wind turbines to which the raw wind data is relevant, based on location of each of the subset of wind turbines of the plurality of the wind turbines.

* * * * *